United States Patent Office 3,083,780
Patented Apr. 2, 1963

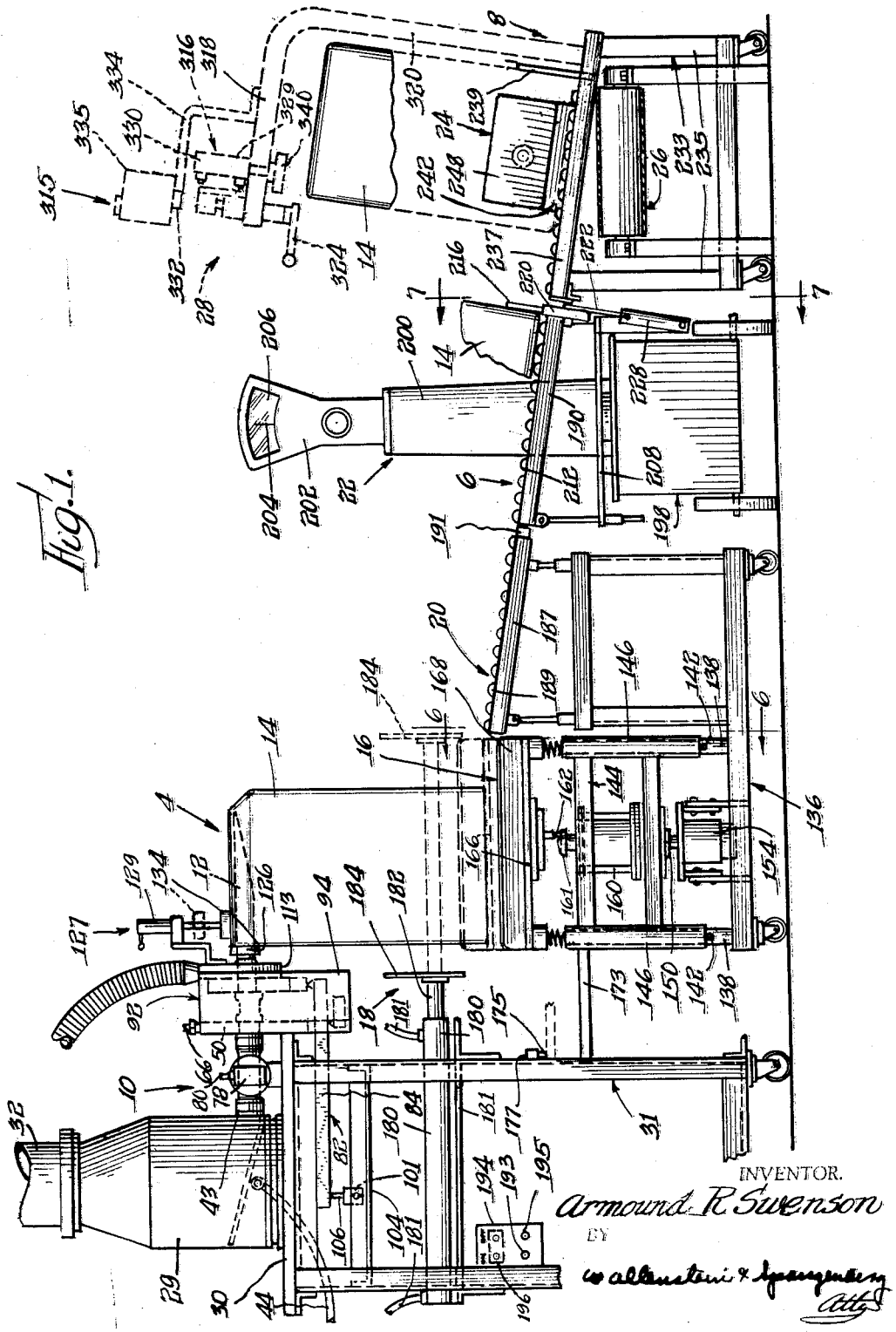

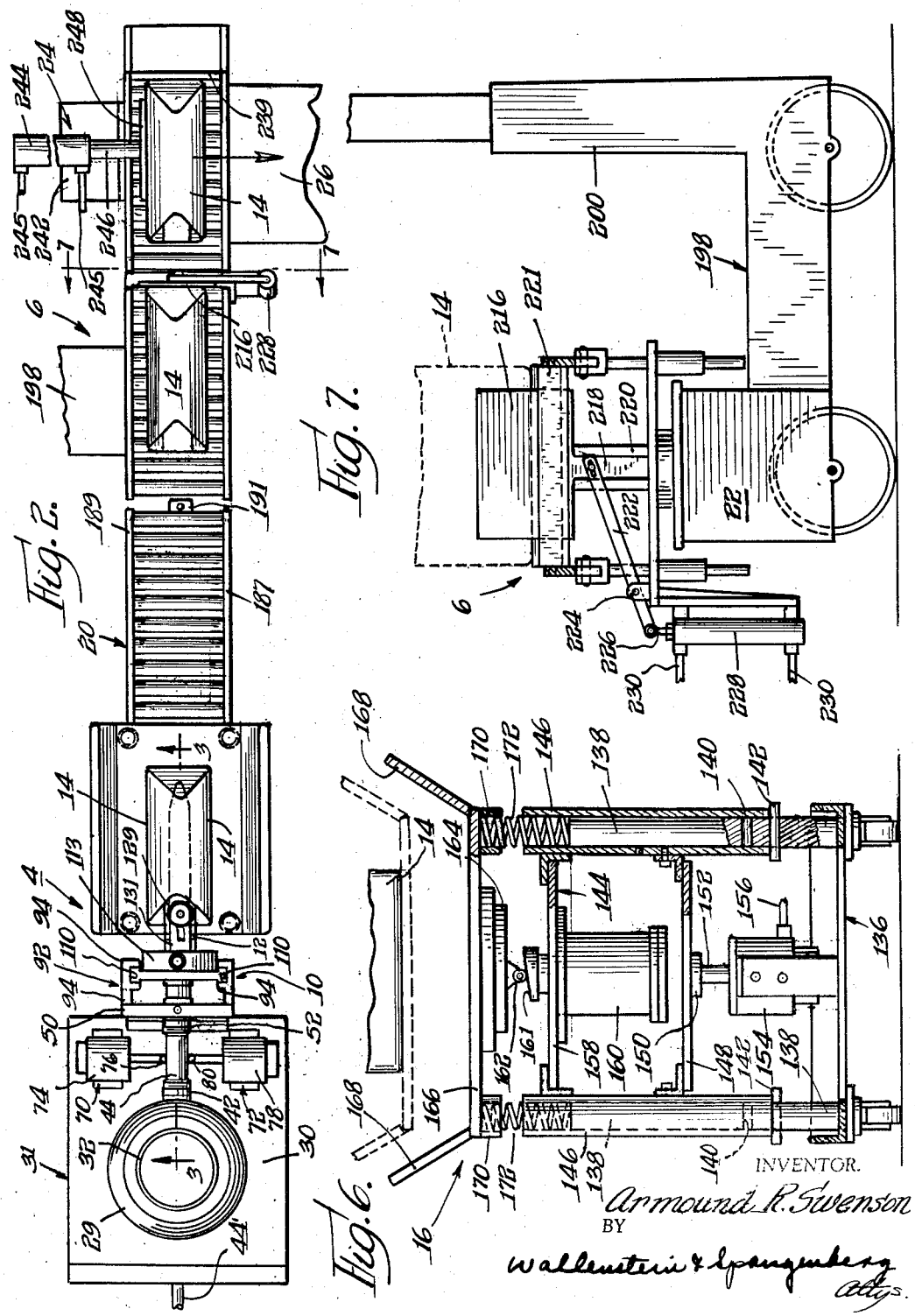

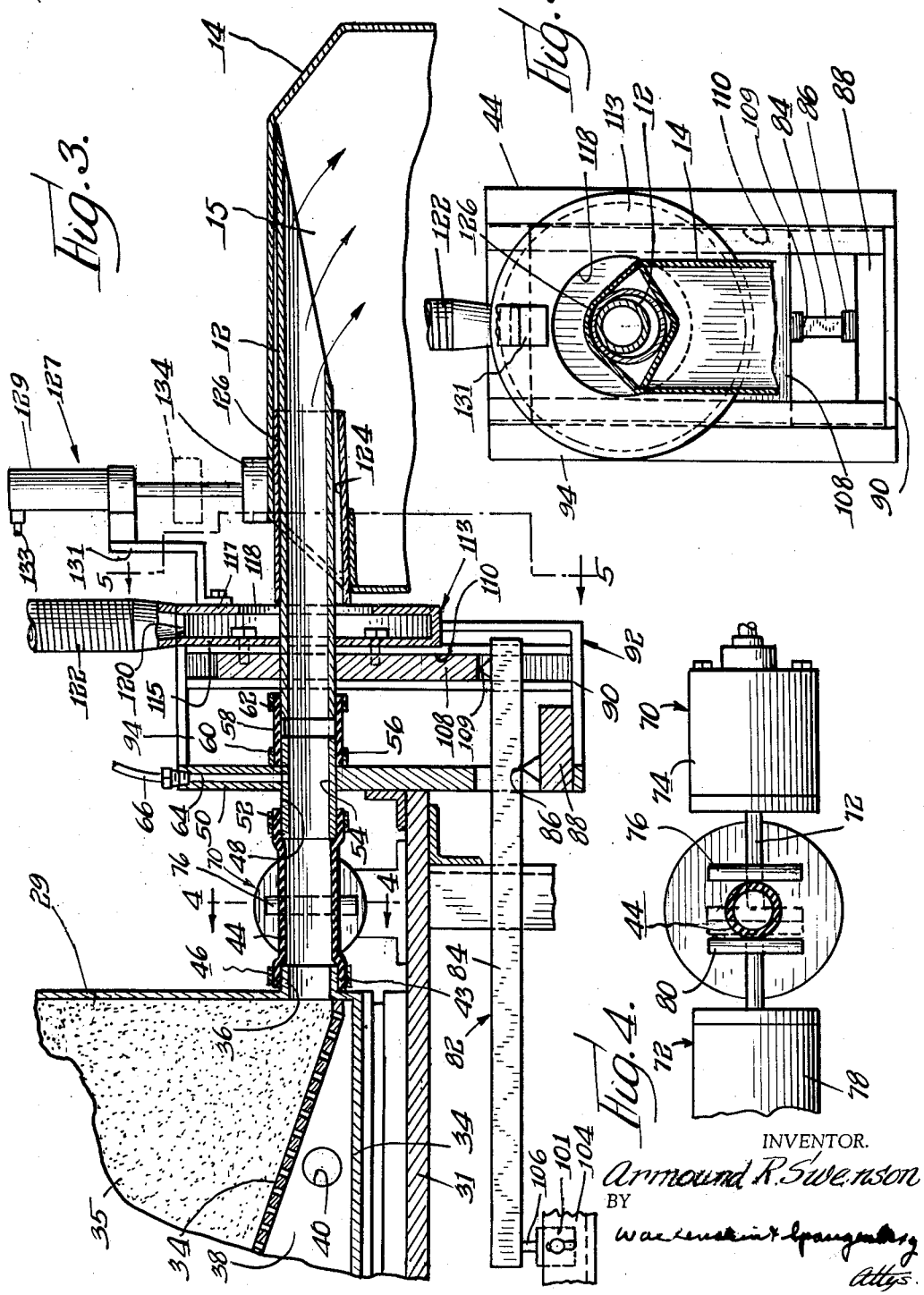

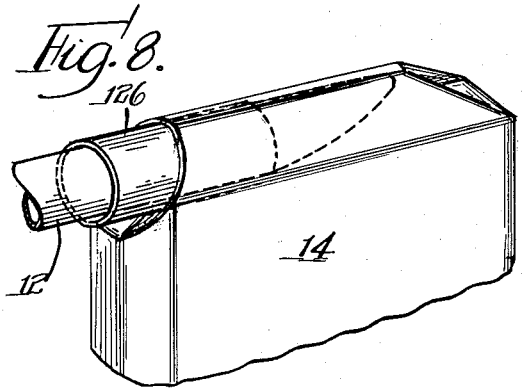
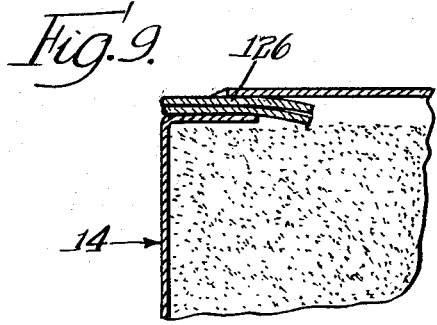
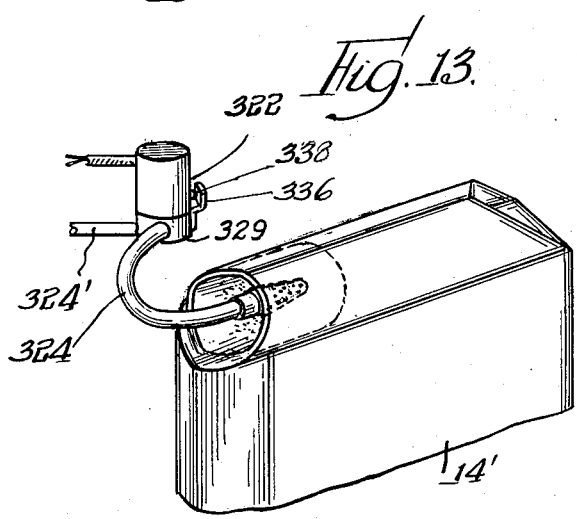
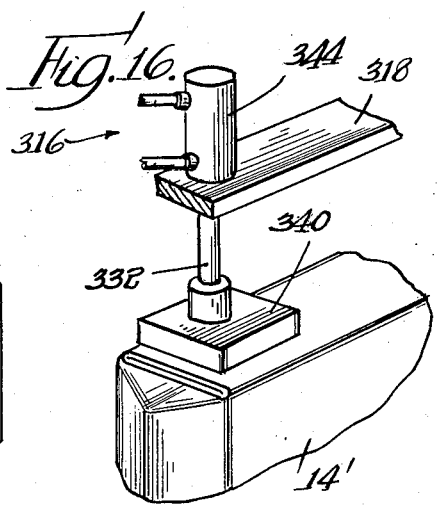
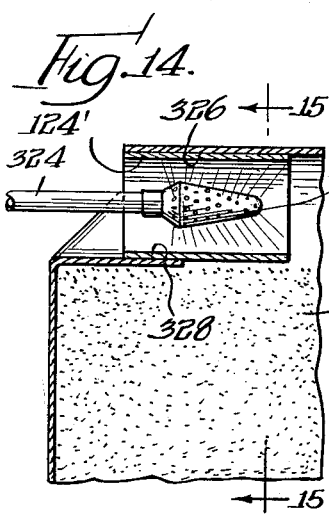
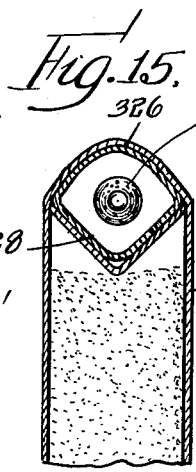
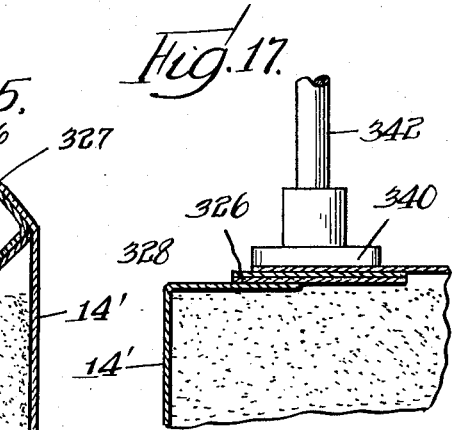

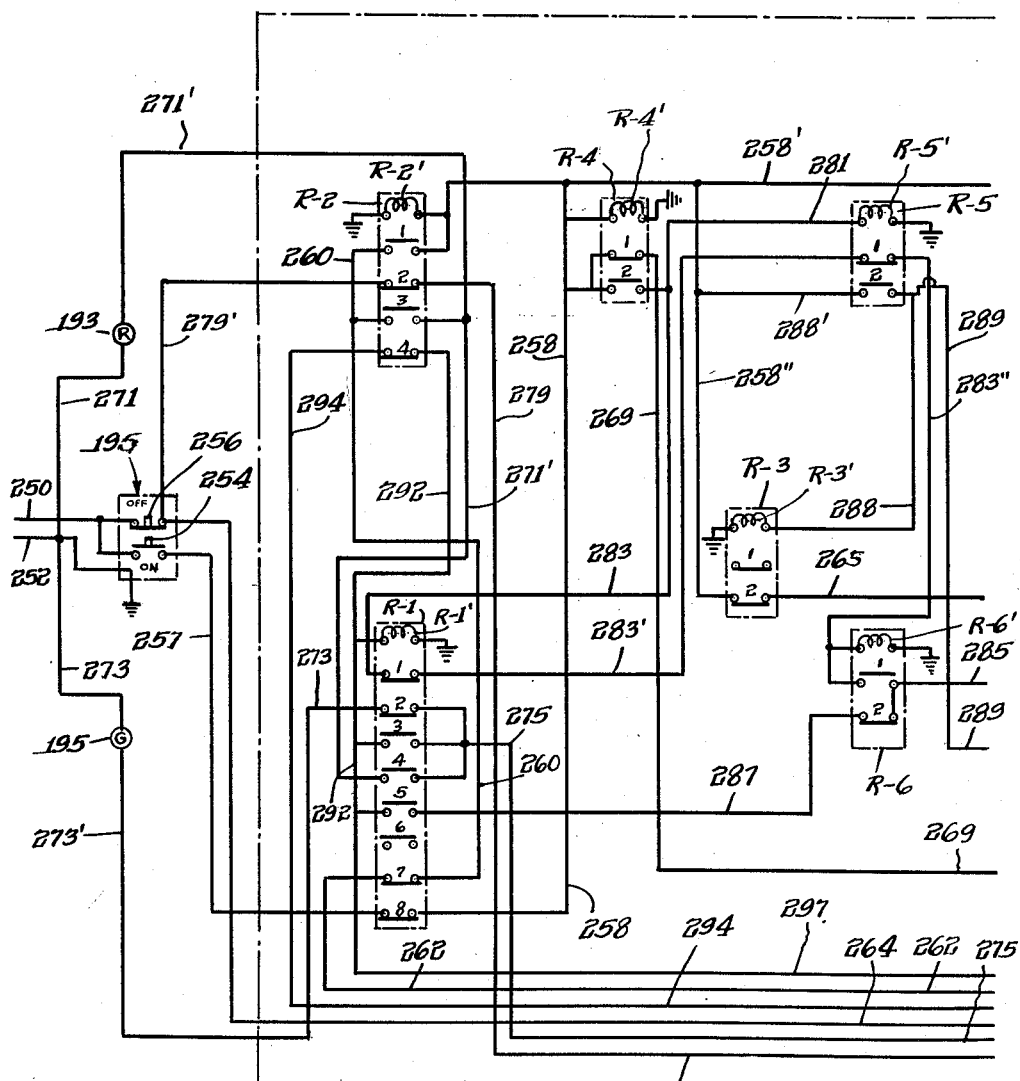

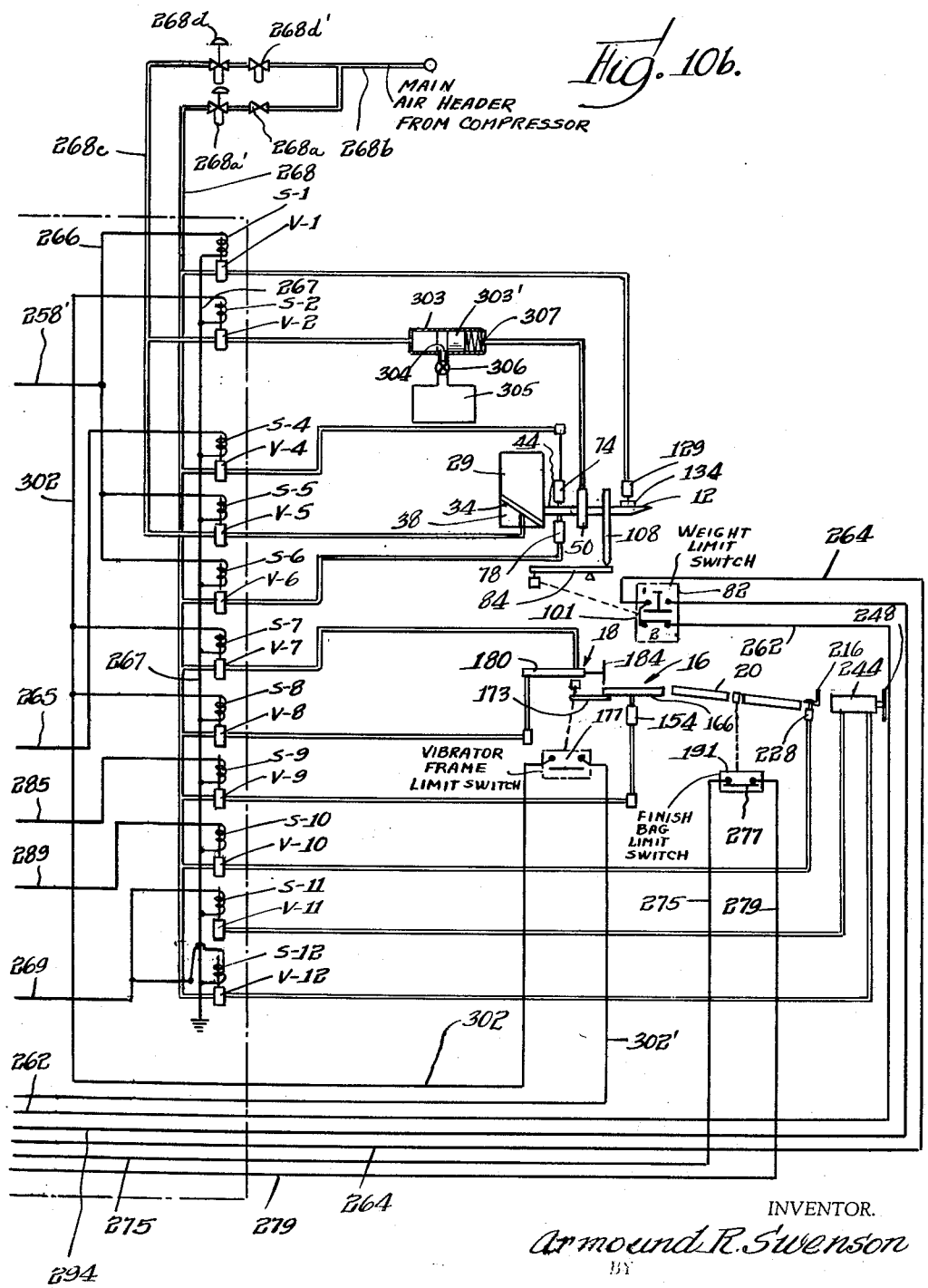

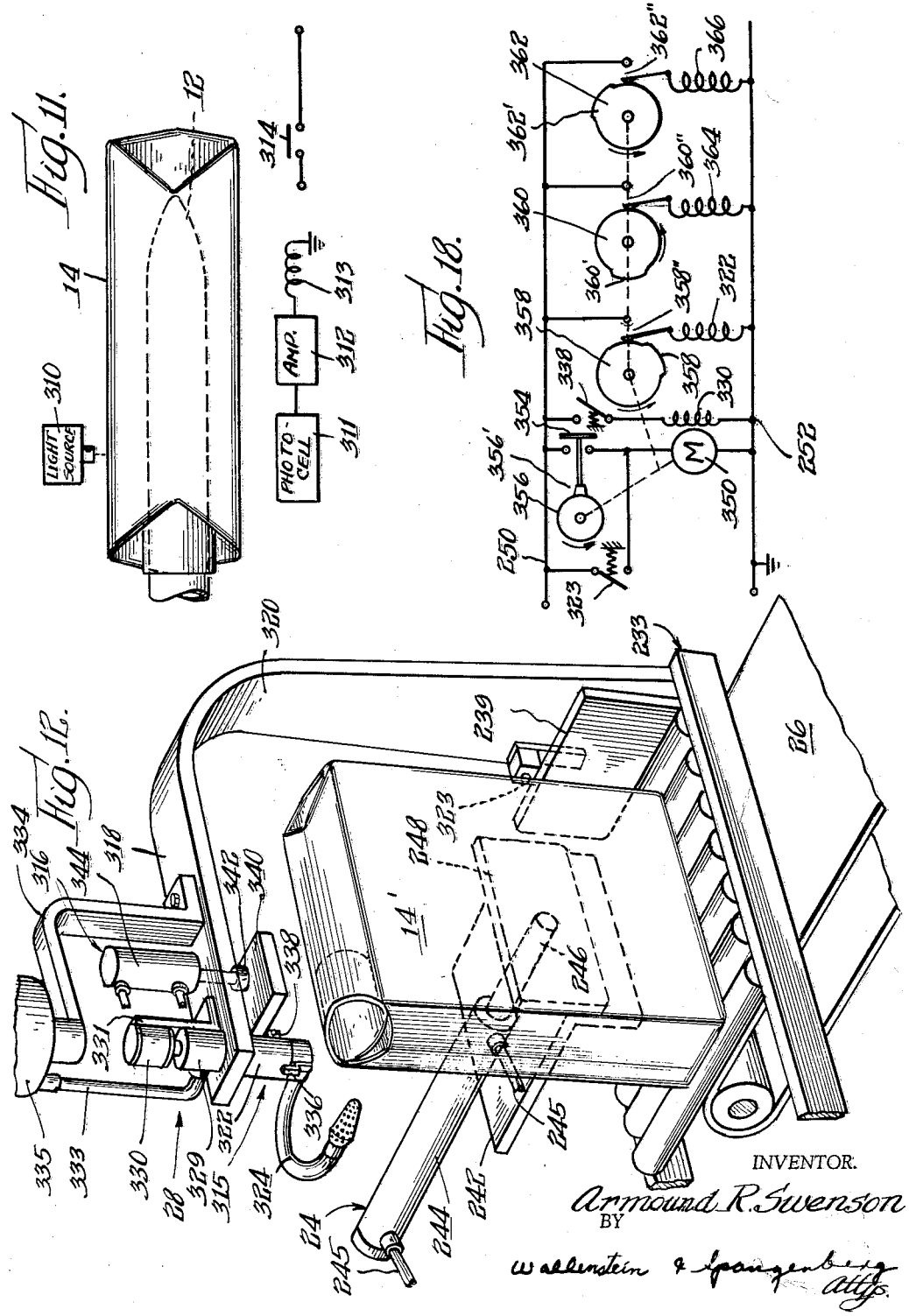

3,083,780
BAG-FILLING AND HANDLING MACHINE
Armound R. Swenson, Amarillo, Tex., assignor to Continental Carbon Company, Amarillo, Tex., a corporation of Delaware
Filed Sept. 10, 1957, Ser. No. 683,127
16 Claims. (Cl. 177—52)

This invention relates to bag handling apparatus and more particularly to a machine used for filling bags with pulverulent material and for automatically conveying the same from a bag-filling station to a discharge station.

Bag-filling and handling machines of various sorts have been heretofore devised for automatically filling bags with pulverulent materials, the bag-filling portion of the machine including a weighing means for automatically controlling the quantity of material fed to the bag, and means for thereafter discharging the bag automatically from the machine. However, these machines left much to be desired from the standpoints of the simplicity, accuracy and reliability thereof and the limited functions performable thereby. Also with these machines, removal of the bags from the filling station thereby often resulted in spillage of material resulting in a waste of material and a messy condition about the machines.

It is one of the primary objects of the present invention to provide a bag-filing and handling machine with provision for an operator to check the weight of a bag which has been discharged from the bag filling station of the machine and, where necessary, perform a manual bag-closing operation. Another object of the present invention is to provide a machine as just described wherein a number of operations may be carried out at the same time on a number of different bags, such as the bag filling operation, a weight or other bag-checking operation, and a bag removal operation at a discharge station of the machine, so that the checking operation doesn't limit the speed of the machine.

Another object of the present invention is to provide a machine for filling bags or the like with pulverulent materials wherein the bag is suspended from a horizontal filling tube extending into a horizontally disposed opening in the bag and supported upon weighing apparatus which controls a switch which automatically stops the flow of material to the filling tube when the contents of the filling tube and bag reach the desired weight, and, further wherein all the material left in the horizontal filling tube after the stoppage of the flow of material thereto is dispensed into the bag so that the desired amount of material is fed to the bag and spillage of material from the filling tube upon removal of the bag therefrom is minimized or avoided entirely.

Still another object of the present invention is to provide a bag filling machine wherein the flow of pulverulent material to the bag filling station is controlled by means including a collapsible conduit which is associated with conduit-collapsing means providing for both a relatively high feeding rate and a relatively low or dribble feeding rate.

A still further object of the present invention is to provide a bag filling machine which utilizes jolting means which jiggles the bag during the feeding of pulverulent material thereto at a high feeding rate, and which, in addition to its jolting function, performs other and important functions including the discharge of the bag from the horizontally extending filling tube from which the bag is suspended.

In its most preferred form, the machine of the present invention has a bag-filling station, a weight-checking station and a discharge station. The filling station includes a horizontally extending filling tube adapted to extend into a horizontally disposed filling opening in the top of the bag to be filled. A bag-holding or clamping means is provided for hoding the bag against the filling tube so that the bag is suspended therefrom. The filling tube is carried by a suitable weighing means, preferably by the end of a balancing beam, which weighing means includes a control switch which is opened or closed when the bag carried by the filling tube reaches a predetermined weight. A flexible conduit connects the inlet end of the filling tube to a hopper containing a supply of the pulverulent material to be fed to the bag.

In accordance with one aspect of the invention, separate feed rate control means located on opposite sides of the collapsible conduit are provided. These feed rate control means each comprise a ram adapted to be moved from a retracted position to an extended position where the ram partially collapses the collapsible conduit. One of the rams is adapted to collapse the conduit to a substantial degree to provide a dribble feed and the other ram located on the other side of the collapsible conduit is adapted to complete the collapsing of the collapsible conduit to shut off the feeding of material from the filling tube completely. With this arrangement, the positiveness and the speed of the feed rate control is maximized.

Another aspect of the invention relates to the prevention of spillage of pulverulent material from the filling tube when the bag is removed therefrom. Since the filling tube is a horizontally disposed member, some material will usually remain in the end of the filling tube which can drip from the end thereof once the bag is removed therefrom. In accordance with another aspect of the present invention, blowout means is provided which is synchronized with the bag-filling operation so that upon termination of the feeding of pulverulent material to the filling tube, a source of air pressure is applied at the base of the filling tube for forcing any pulverulent material remaining in the filling tube into the bag, so that the bag receives its full complement of material and no material is left in the filling tube to spill from the end thereof when the bag is removed therefrom. To minimize the work to be performed by the operator in mounting the bag upon the filling tube, in one form of the invention a photo-cell control means is provided including a light beam in the path of movement of the bag upon the filling spout. The interruption of the light beam by the placement of the bag upon the filling tube is utilized to automatically effect operation of a bag-holding means which clamps the bag upon the filling tube and other control means which starts the bag-filling operation.

Another aspect of the invention relates to the method of removing the bag from the filling spout without aid of the operator, using the same apparatus which jolts the bag during the initial filling thereof. This jolting apparatus is automatically raised to contact the bottom of the bag and shake the same to compact the material therein. As the weight of the material in the bag approaches the desired weight, the jolting apparatus is retracted from the bag so that weighing means carrying the filling tube may accurately weigh the contents of the bag. When this weight is reached, a control switch is operated which effects operation of the above mentioned feed rate control means which completely collapses the collapsible conduit connected to the filling tube. Operation of this control switch also initiates the raising of the jolting mechanism for a second time which lifts the bag from the filling tube. Almost simultaneously, the above mentioned bag-holding means is released from the bag and, as the jolting means reaches its upper limit, a limit switch is actuated which initiates operation of a pushing ram which pushes the bag off of the filling tube and off the jolting means upon a conveyor. The above mentioned limit switch was also actuated when the jolting means was raised the first time to shake the bag during the filling thereof. However, suitable means controlled by the weighing means is provided for rendering the tripping of the limit switch ineffective until the bag has been filled to the desired weight. The latter conveyor carries the bag discharged from the filling station preferably to the platform of a weighing scale at the weight-checking station.

In accordance with another aspect of the invention, the bag handling machine is arranged so that a number of operations may be carried on simultaneously. Thus, as a given bag reaches the weight-checking station, a finished bag limit switch is tripped which enables a new filling cycle to begin upon the application of a new bag to the filling tube in the manner above explained, through use of a photo-cell and light beam or through the aid of a manual start switch. As the latter bag is being filled, the operator performs suitable checking operations at the checking station, such as checking the weight of the bag on the weighing scale. Preferably, the platform of the weighing scale is inclined and a gate or stop shoulder is provided at the bottom thereof which prevents the movement of the bag by force of gravity from the weighing scale platform. A fixed time interval after the initiation of a filling cycle, which interval is sufficient to enable an operator to perform the necessary checking operations but which is less than the time it takes to fill a bag, the above mentioned gate at the bottom of the weighing scale platform is automatically lowered so that the bag thereon is carried by force of gravity to the discharge station. The bag which was previously at the discharge station must be discharged before the last mentioned bag at the checking station is conveyed thereto. Accordingly, bag-discharging means is provided at the discharge station which is timed with the beginning of the filling cycle to discharge the bag thereat before the next bag is conveyed thereto.

Other features of the invention relate to various details of construction of the machine and of the control circuits therefor, and these together with other objects and advantages of the invention will become apparent upon making reference to the specification to follow, the claims and the drawings wherein:

FIG. 1 is a side elevation view of the bag-filling and handling machine of the present invention;

FIG. 2 is a plan view of the machine of FIG. 1;

FIG. 3 is an enlarged, fragmentary, vertical, longitudinal sectional view through the machine, taken along section line 3—3 in FIG. 2;

FIG. 4 is a transverse vertical sectional view through the machine, taken along section line 4—4 in FIG. 3;

FIG. 5 is a transverse vertical sectional view of the machine, taken along section line 5—5 in FIG. 3;

FIG. 6 is an end elevational view of the bag jolting and lifting means of the machine, taken along line 6—6 in FIG. 1;

FIG. 7 is an end elevational view of the weight-checking station of the machine, taken along line 7—7 in FIG. 2;

FIG. 8 is a fragmentary perspective view of a bag suspended from the filling tube during a bag filling operation;

FIG. 9 shows a vertical longitudinal sectional view of the bag after the sleeve thereof has been tucked in to close the bag opening;

FIGS. 10a and 10b together form a schematic diagram of the electrical and hydraulic control circuits for the machine;

FIG. 11 is a diagram of a photo-cell control circuit for starting a bag-filling operation;

FIG. 12 is a perspective view at the discharge station of a modified form of the machine which includes gluing and bag-closing apparatus for automatically sealing a modified bag which omits the tuck-in sleeve;

FIG. 13 is a fragmentary perspective view of a bag at the discharge station of the machine showing the gluing apparatus inserted into the filling opening of the bag;

FIG. 14 shows a vertical, longitudinal sectional view through the bag and the glue-applying apparatus shown in FIG. 13;

FIG. 15 is a vertical, transverse sectional view through the bag and glue-applying apparatus shown in FIG. 14, taken along section line 15—15 therein;

FIG. 16 is a fragmentary perspective view of the bag sealing apparatus with the sealing ram thereof in an extended position where it closes the mouth of the bag;

FIG. 17 is an enlarged fragmentary vertical sectional view of the bag sealing apparatus of FIG. 16; and FIG. 18 is a simplified schematic diagram of the control circuit for operating the glue-applying and sealing apparatus shown in FIGS. 13 through 17.

As shown most clearly in FIGS. 1 and 2, the machine has a bag filling station 4, a checking station 6, and a discharge station 8. At the bag filling station 4, there is apparatus generally indicated by reference numeral 10 which automatically supplies the proper quantity of material through a horizontally-extending filling tube 12, from which is supported a bag 14 to be filled with the material. Supported below the filling station is bag jolting and lifting apparatus generally indicated by reference numeral 16 and bag-discharging apparatus 18 by means of which a filled bag may be automatically pushed from the filling tube 12 onto an inclined conveyor means 20 which conveys the bag to the checking station 6 which preferably has weighing scale apparatus generally indicated by reference numeral 22. At the checking station, the operator may visually check the actual weight of the contents of the bag delivered thereto and, where necessary, tuck in the sleeve on the bag where a sleeve-type bag is utilized. At the proper time the checked bag is released automatically from the checking station to the discharge station 8.

The discharge station 8 includes pusher mechanism 24 for discharging the bag delivered to the discharge station to suitable conveyor means such as a transverse belt type conveyor 26. The discharge station may also include, where a sleeveless type bag is used, glue-applying and sealing apparatus generally indicated by reference numeral 28 and shown only in dotted lines in FIG. 1. This apparatus applies glue to the opening of the bag, and seals the bag by pressing the glued walls of the opening shut.

Now that the basic components making up the most preferred form of the invention have been briefly outlined, the structural and operating details of these various components will now be described.

Referring now most particularly to FIGS. 1 through 6 showing the apparatus at the bag filling station of the invention, this apparatus includes a hopper 29 supported upon the upper platform 30 of a roller-carrying framework 31. The hopper holds a supply of the pulverulent material 35 (FIG. 3), such as carbon black, to be delivered to the filling tube 12. An inlet pipe or conduit 32 connects with the top of the hopper 29 through which conduit fresh supplies of pulverulent material may be fed when necessary. The hopper has a perforated inclined bottom wall 34 whose bottom end leads to a hopper outlet opening 36. The perforations in the wall 34 are sufficiently small to inhibit passage of the pulverulent material therethrough. An air pressure inlet chamber 38 is located below the perforated bottom hopper wall 34, and this chamber has an inlet opening 40 connected to an inlet air pressure line 44'. A solenoid-operated valve to be described is opened to apply air pressure at the start of a bag filling cycle to the line 44'. This air pressure is applied to the hopper interior through the perforated bottom wall 34 thereof which air pressure forces pulverulent material in the hopper through the outlet opening 36 thereof.

Hopper 29 has a cylindrical extension 43 surrounding the outlet opening 36 at the bottom thereof and a collapsible conduit 44 of rubber or other similar material is applied over the extension 43 and held securely thereupon by a split-ring clamp 46. The other end of the collapsible conduit 44 is stretched over one of the projecting ends of a short connecting tube 48 passing through and fixed to a vertical backing plate 50 supported upon the platform 30. The conduit 44 is locked upon the end of the tube 48 by a split-ring clamp 52. One end of a short section of collapsible conduit 58 made of rubber or similar material is stretched over and secured around the other projecting end of the connecting tube 48 by a clamp 60 and the other end of this short section of flexible conduit 58 is secured around the rear end of the filling tube 12 by a clamp 62.

The backing plate 50 has a vertical bore 64 formed therein which communicates at its top with an air pressure inlet line 66 connected to a suitable solenoid-operated valve to be described which feeds a source of air pressure just before the bag 14 is removed from the filling tube 12 to the bore 64. The bore 64 at its bottom communicates with the interior 54 of the connecting tube 48. As will appear, the application of air pressure to the tube interior will effect a blow-out operation which cleans the filling tube 12 of any material remaining therein at the end of a bag-filling operation.

The flow of pulverulent material from the hopper 29 to the filling tube 12 is controlled by feed control means supported upon the platform 30 of framework 31 and generally indicated by reference numerals 70 and 72, shown most clearly in FIGS. 2 and 4. Feed control means 70 may comprise an air cylinder 74 having a piston (not shown) horizontally movable therein for extending and retracting a transverse ramrod 76. In the retracted position of the ramrod 76, the ramrod only lightly engages the collapsible conduit 44 in its normal or expanded condition. In its extended position the ramrod 76 has the position shown in dotted lines in FIG. 4 where it almost completely collapses the conduit 44. Sufficient clearance is then left in the flexible conduit 44 to enable only a very slow feeding of material therethrough, which provides a dribble feed. A solenoid valve to be described controls the movement of the piston within the air cylinder 74 in a well known manner.

The other feed control means 72 is mounted on the opposite side of the conduit 44 and has a similar air cylinder 78 with a piston, not shown, movable therein under control of a solenoid valve to be described. The piston in the cylinder 78 is connected to a transverse ramrod 80 which is movable from a retracted position where it makes light contact with the collapsible conduit 44 to an extended position shown in dotted lines in FIG. 4 where it partially collapses the conduit 44. When both ramrods 76 and 80 are in their fully extended positions, the conduit 44 is completely collapsed so that no material can be fed therethrough from the hopper.

The weight of the filling tube 12 and the bag 14 connected thereto during a bag-filling operation is carried by suitable weighing means generally indicated by reference numeral 82 (FIG. 3). This weighing means includes a balancing beam 84 extending through an opening at the bottom of the backing plate 50 and pivoted upon a knife edge 86 carried upon a suitable base 88. The base 88 is supported upon the bottom wall 90 of a support head assembly indicated by reference numeral 92. The backing plate 50 forms a rear wall for the support head assembly. The support head assembly 92 has a pair of horizontally spaced apart side walls 94—94 extending upwardly from the aforementioned bottom wall 90 and the rear end of the filling tube 12 is located between the side walls 94—94.

Supported below the rear end of the balancing beam 84 is a weight limit switch 101 (see FIG. 3). The limit switch 101 may be supported in any suitable manner for vertical adjustment upon the vertical leg of an angle bar 104 fixed to the framework 29. The limit switch 101 has an upstanding outwardly spring-urged switch-actuating pin 106 which is held in a given depressed contact opening position by the balancing beam until a given selected weight is applied to the front end of the balancing beam 84. Then the rear end of the beam is raised to a position where a set of contacts to be described are closed by the pin 106. It can be seen that the weight at which the limit switch is tripped can be adjusted by varying the vertical position of the limit switch 101 with respect to the balancing beam 84 for a given weight supported thereby.

The forward end of the balancing beam 84 carries the weight of a vertically extending slide plate 108 resting upon a knife edge 109. The plate 108 is guided for vertical movement in guide slots 110—110 respectively formed on the inner surfaces of the side walls 94—94 of the support head assembly 92. The filling tube 12 passes through and is carried by the slide plate 108.

Surrounding the filling tube 12 in front of the slide plate 108 is an annular housing 113 having a rear wall 115 (FIG. 3) bolted or screwed to the slide plate 108 and a front wall 117 having a large circular opening 118 through which the filling tube 12 extends. The annular housing 113 has an opening 120 in the top thereof to which is connected a flexible conduit 122 leading to a source of vacuum which draws dust through the housing opening 118 which may escape from the bag 14 as it is being filled.

The filling tube 12 extends into a horizontally extending opening 124 formed in the top of the bag 14 (FIG. 3). The bag illustrated in FIG. 3 is a conventional type bag for holding pulverulent materials, such as carbon black, etc., and has a horizontally extending paper sleeve 126 defining the horizontally extending opening 124 into the bag interior. The filling tube 12 has a pointed front end, the point being at the top of the filling tube. The bag 14 is suspended from the filling tube. Bag holding means generally indicated by reference numeral 127 is provided for securely holding the bag upon the filling tube. This bag holding means may include a vertical air cylinder 129 in hich is supported for vertical movement a piston, not shown. Cylinder 129 is supported by means of a bracket 131 from the front wall 117 of the annular housing 113. An air line 133 leads to the top of the cylinder 129 and the air pressure therein is controlled by means of a solenoid valve to be described. Connected to the piston in the latter cylinder is a clamping head 134 which in its extended or lowered position engages the top wall 15 of the bag and presses it securely against the top of the filling tube 12. The latter piston may be normally urged upwardly by a spring or the like, not shown, and the application of pressure to the top of the cylinder 129 forces the piston and thus the clamping head down against the top of the bag 14.

Referring now more particularly to FIGS. 1 and 6, in accordance with the present invention, the jolting and lifting apparatus generally indicated by the reference numeral 16 is provided to shake the bag 14 during most of the time the bag is being filled. As the bag approaches its full weight, the shaking of the bag 14 is terminated so that the weighing means 82 may accurately weigh the contents of the bag. The jolting and lifting means 16 is mounted upon a separate roller-carrying frame structure generally indicated by reference numeral 136. Extending upwardly from the corners of the frame structure are vertical cylindrical posts 138. Each of the posts is provided with corresponding vertically-spaced horizontal bores 140 adapted to selectively receive stop pins 142 which project beyond the associated posts 138 near the bottom ends thereof. A frame assembly 144 is supported for vertical movement upon the posts 138 and includes tubular members 146 telescoping over the posts 138. A horizontal metal plate 148 is supported between intermediate portions of the tubular members 146 and the plate rests upon the head 150 of an upwardly and downwardly movable rod 152 extending from a piston-containing air cylinder 154. An air pressure line 156 extends to the bottom of the cylinder 154 and, by means of solenoid valves to be described, air pressure is applied to line 156 to raise the piston within the cylinder 154 and thereby lift the head 150 of the rod 152. Raising of the head 150 moves the frame assembly 144 and those parts connected thereto upwardly with it.

Extending between the upper ends of the tubular members 146 is a support platform 158 on the bottom of which is mounted an electric motor 160. The shaft of the motor 160 extends above the platform 158 and carries on the end thereof cam ring 161. The vertical extent of the upper surface of the cam ring 161 varies around the ring and riding upon the upper surface of the cam ring is a follow roller 162 extending from a cylindrical depending portion 164 of a platform 166. Platform 166 has upwardly extending side walls 168—168 and open-bottomed cylindrical extensions 170 extend downwardly from the corners of the platform 166. Each of the cylindrical extensions 170 overlies the open upper ends of one of the tubular members 146. The platform 166 is resiliently supported upon compression springs 172, the upper portions of which fit within the cylindrical extensions 170 and the bottom portions of which fit within the corresponding tubular members 146. The bottoms of these springs rest upon the tops of the associated posts 138.

As the cam ring 161 is rotated by the motor 160, the roller 162 will follow the undulations of the upper surface of the cam ring 161 and thereby vibrate the platform 166 up and down relative to the frame assembly 144.

When the rod 152 associated with the cylinder 154 is in its fully retracted and lowered position, the tubular members 146 rest upon the stop pins 142 extending from the posts 138. The lowermost position of the frame assembly 144 can be adjusted by adjusting the elevation of the pins 142. To enable the plate 148 which rests upon the head 150 of the rod 152 to rest upon the latter head for the various adjusted elevations of the frame assembly 144, the plate 148 may be adjustably mounted upon the frame assembly 144 in any suitable way so that it may assume a number of different vertical positions corresponding to the different positions of the stop pins 142. Alternatively, spacer discs may be provided which can be mounted upon the top of the head 150 upon which the plate 148 rests.

The desired lowermost elevation of the frame assembly 144 is determined by the size of the bag 14 being used with the machine. It is important that the bottom of the bag 14 be free of contact with the platform 166 when the frame assembly 144 is in its lowermost position. When the rod 152 is in its extended or raised position, platform 166 is raised to a position where it engages and lifts the bottom of the bag 14 even when the roller 162 rides on the lower section of the cam ring. Then, the vibrating movement applied thereto will shake the bag so as to compact the material therein during most of the filling period.

Referring more particularly to FIG. 1, a switch-actuating arm 173 extends from one of the tubular members 146 of the frame assembly 144. In the upper position of the frame assembly 144, the switch-actating arm 173 engages the switch-actuating pin 175 of a limit switch 177. During the filling of the bag 14, the actuation of the switch 177 forms no useful function. As the bag approaches a filled condition, the jolting and lifting apparatus 16 is lowered so that the bottom of the bag 14 is not touching the platform 166, thereby enabling the weighing means to accurately weigh the contents of the bag. As soon as the bag is filled, however, the limit switch 101 associated with the weighing means 82 is actuated and the clamp disc 134 is raised to unclamp the bag from the filling tube. Also in a manner to be explained, the frame assembly 144 is raised for a second time. As the frame assembly reaches the top of its travel this second time, switch-actuating arm 173 again actuates the limit switch 177 and this time the switch is operative to initiate movement of pusher apparatus 18 which pushes the bag 14 off the platform 166 while the weight of the bag 14 is off the filling tube.

The bag pushing apparatus 18 may comprise a cylinder 180 supported upon a platform 181 on the framework 31. The cylinder contains a horizontally movable piston, not shown. Hydraulic lines 181—181 extending to opposite ends of cylinder 180 control the fore and aft movement of the piston and of an arm 182 connected thereto. The end of the arm 182 carries a pusher plate 184 which, in its fully extended position, occupies the position shown in the dotted lines in FIG. 1, where the bag 114 is completely pushed from the filling tube 12 and the platform 166 onto the conveyor means 20.

The conveyor means 20 may also be supported upon the roller-carrying framework 136 which carries the jolting and lifting apparatus 16. The conveyor means 20 comprises a support frame 187 carrying a number of horizontally oriented rollers 189, the upper extremities of which extend in a plane inclining from the front end of the platform 166 in the uppermost position of the frame assembly 144 to a bottommost point at the level of the high side of an inclined platform 190 of the weighing scale 22. The elevation of the support frame 187 is preferably vertically adjustable so that the conveyor means 20 may be utilized with bags of different lengths. As above indicated, as the length of the bag varies, the elevation of the platform 166 in its raised position is accordingly varied.

A limit switch 191, sometimes referred to as a finished bag switch, extends in the path of travel of the bags at the front end of the conveyor means 20 so that it will be actuated as a bag leaves the conveyor means and passes to the checking station 22. As will appear, actuation of the switch 191 will enable the machine to start a new bag-filling cycle initiated by the operator placing a new bag upon the filling tube 12 and either depressing the start pushbutton of an on-off switch or interrupting the light beam of a photo cell. As soon as a new filling cycle begins, the operator checks the weight of the previously filled bag then at the weight-checking station 6 and tucks the sleeve 126 thereof into the bag so as to effectively close the same. This must be done approximately in the time it takes to fill a bag.

During a period beginning with the start of a bag filling operation and ending with the movement of the bag past the finished bag limit switch 191, a red light 193 mounted upon a panel 194 supported on the framework 31 is lit. The above-mentioned on-off switch may be supported on the panel 194, the switch being identified by reference numeral 196. After the bag passes by the limit switch 191, a green light 193 on the panel 194 is lit and the red light is extinguished. As soon as a new bag-filling cycle begins, the red light 193 is again lit and the green light is again extinguished.

Referring now most particularly to FIGS. 1 and 7, the checking station 6 includes the above-mentioned weighing scale 22. The weighing scale may be supported upon a roller carrying framework 198 having a support post 200 carrying a weight-indicating head 202 having an index pointer 204 thereon movable over a calibrated scale 206. The weighing scale further includes a platform 208 which is connected to the weighing mechanism, not shown, and which carries the weight to be measured. Platform 208 supports thereabove the inclined platform 190 upon which are rotatively mounted rollers 212 whose upper extremities extend in a plane which is a continuation of the plane of the inclined plane at the top of the rollers 189 of the conveyor means 20. The elevation of the roller carrying frame 210 is variable in any suitable way for the same reasons that frame 187 of the conveyor means 20 is adjustable in elevation.

At the lower or forward end of the inclined platform 190, there is supported for vertical movement a gate plate 216 which acts as a bag stop. The bag delivered to the checking station is carried by the rollers 212 to the bottom end of the inclined platform 190 so as to bear against the gate plate 216. The gate plate 216 has a depending neck portion 218 (FIG. 7) which is supported for vertical sliding movement in a suitable guide piece 220. A bar 221 supported in spaced relation to the end and below the platform 190 forms a guide slot for the movement of the plate 216. The gate plate is moved up and down by means including an operating rod 222 which is pivoted between its ends upon a pivot bracket 224. One end of the rod 222 is pivotally secured to the neck 218 of the gate plate 216 and the other end thereof is secured to the end of operating rod 226 connected to a piston, not shown, vertically movable in a cylinder 228. Air lines 230—230 extend to opposite ends of the cylinder 228 and are connected to solenoid valves to be described which control the movement of the piston within the cylinder 228. As will appear, after the completion of a bag filling operation, the last mentioned solenoid valve is actuated to effect the raising of the rod 226 and the consequent lowering of the gate plate 216 below the level of the platform 190, so that the bag then at the checking station will be discharged by force of gravity to the discharge station 8.

Where a sleeve-type bag is being utilized, the discharge station 8 need only include that apparatus shown in solid lines in FIG. 1. This includes an inclined roller-carrying framework 233 having four vertical posts 235 at the corners thereof and supporting an inclined roller-carrying platform 237 forming a continuation of the inclined scale platform 190. The elevation of the roller-carrying platform 237 is accordingly vertically adjustable. A fixed stop wall 239 extends upwardly from the lower forward end of the platform 237 to hold the bag delivered thereto from rolling off the platform. The previously mentioned bag-discharging means 24 is supported on one side of the platform 237 by a bracket plate 242 or the like secured to the platform 237. The bracket plate 242 carries a cylinder 244 in which is mounted a horizontally movable piston, not shown. Air lines 245—245 extend to opposite ends of the cylinder 244 and are controlled by suitable solenoid valves to be described which move the piston in the cylinder 244 back and forth.

A push rod 246 is connected to the piston at one end and carries a ram plate 248 at the other end. Some time before the lowering of the gate plate 216 at the weight-checking station 6, the piston within the cylinder 244 is moved in a direction which brings the ram plate 248 against the bag 14 at the discharge station to push the same upon the above mentioned conveyor belt 26 which passes through the opening between the vertical support posts 235 of the framework 233.

The control circuits for controlling the various above mentioned solenoid valves will now be described in connection with the electrical and air circuit diagram in FIGS. 10a and 10b. However, before describing this circuit in detail, it will be helpful to review the various operations to be performed by the control circuit and the sequence of operation tof the various parts of the machine. These operations are as follows:

(a) At the beginning of a bag-filling cycle when the on-off switch 196 (FIG. 1) is actuated, the control circuit: (1) effects the lowering of the clamping head 134 (FIG. 3) of the bag-holding means 127 against the top of the bag 14 which has been slipped over the filling tube 12; (2) applies air pressure to the air pressure chamber 38 at the bottom of the hopper 29; (3) effects the extension of the ram plate 248 which pushes the bag at the discharge station upon the conveyor 26; and (4) energizes the red light 193 and de-energizes the green light 195.

(b) Five seconds after the beginning of a bag-filling cycle, the jolting and lifting apparatus 16 is raised in position so that the bottom of the bag is engaged by the vibrating platform 166 and vibrated to compact the pulverulent material being fed thereto.

(c) Ten seconds after the beginning of the bag-filling cycle, solenoids are actuated which: (1) effect the lowering of the jolting and lifting apparatus 16 to enable the weighing means to accurately weigh the contents of the bag; (2) effect the lowering of the gate plate 216 at the weight-checking station 6 to deliver the bag 14 thereat to the discharge station 8; and (3) effect the extension of the dribble feed ramrod 76 to partially collapse the collapsible conduit 44.

(c) when the bag receives its full weight of material, solenoids are actuated which: (1) effect the movement of the shut-off ramrod 80, which completely collapses the conduit 44; (2) shuts off air pressure to the air pressure chamber 38 at the bottom of the hopper; (3) effect the raising of the jolting and lifting apparatus 16 to take the weight of the bag 14 off of the filling tube; (4) effect the retraction of the clamping head 134 to release the bag from the filling tube; (5) effect the raising of the gate plate 216 at the weight-checking station; and (6) prepare a circuit associated with the limit switch 177 for operation.

(d) When the jolting and lifting apparatus 16 is in its fully raised position, and the activating arm 173 actuates the limit switch 177, a solenoid is actuated which effects the forward movement or extension of the pusher plate 184 which pushes the bag off the platform 166 of the jolting and lifting apparatus 16 and onto the conveyor means 20.

(e) As the bag passes the finished bag limit switch 191, the machine is ready for a new bag-filling cycle and the red light 193 is extinguished and the green light 195 is lit.

In the schematic diagram of FIGURES 10a and 10b, the contacts of the various relays shown therein are in their normal positions, that is their positions when the associated relays are de-energized.

The main source of power for energizing the various relays and solenoids may be a source of alternating or direct current voltage available on power lines 250 and 252, the latter being a grounded line. Line 250 extends to the on-off switch 196. Switch 196 has a normally-open depressable push button "on" switch 254 and a normally-closed push button "off" switch 256. When the "on" push button switch 254 is depressed, a circuit is completed which extends from the power line 250 to the then momentarily closed push button switch 254, line 257, the #8 normally-closed contacts of a control relay R-1 and line 258 leading to the coil R-2' of a relay R-2. The energization of relay R-2 results in the closure of the #1 normally-open contacts thereof which constitute holding contacts which connect the coil R-2' to the line 250 by a circuit including line 260, the #7 normally-closed contacts of the relay R-1, line 262, the #2 normally-closed contacts of the weight limit switch 101, and line 264 leading to the normally-closed push button "off" switch 256 connected to the line 250.

The voltage applied to the coil R-2' is also applied via a main branch line 258' and a line 266 to one end of a solenoid S-1 whose other end is grounded through a common ground line 267. Solenoid S-1 controls a valve V-1 which, upon energization of the solenoid S-1 connects an air pressure conduit 268 to the top of air cylinder 129 which lowers the piston in the cylinder 129 of the bag-holding means to bring the clamp head 134 against the top of the bag 14. The air line 268 has a shut-off valve 268a to disconnect the line from a main air header line 268b extending to the output of an air compressor, not shown. The line 268 also has a pressure adjusting and regulating means 268a.

The common line 266 feeding the solenoid S-1 also is connected to one end of solenoids S-5 and S-6 whose other ends are connected to the common ground line 267. Energization of the solenoid S-5 opens a valve V-5 which connects an air pressure line 268c to the air chamber 38 at the bottom of the hopper 29. Line 268c is connected to header line 268b through a pressure adjusting and regulating means 268d and a shut-off valve 268d'. Energization of the solenoid S-6 closes valve V-6, which is a normally open valve, to disconnect the air line 268 from air cylinder 78 which, through suitable spring or other means, not shown, effects the retraction of the shut-off ramrod 80.

Upon energization of relay R-2, another branch circuit is energized which extends from main branch line 258' through a sub-branch line 258", the #2 normally-closed contacts of a relay R-3, and a line 265 leading to a dribble-feed solenoid S-4 which is grounded through common ground line 267. Energization of solenoid S-4 closes a normally-open valve V-4 disconnecting the air pressure line 268 from the dribble feed air cylinder 74 which, through suitable spring means or the like in the cylinder, retracts the ramrod 76.

Simultaneously with the energization of relay R-2, the coil R-4' of a five second time delay relay R-4 is energized through connection of one end of this coil to the line 258. The other end of the coil is grounded. Five seconds after the coil R-4' is energized, its #1 set of normally closed contacts open and its #2 set of normally-open contacts close.

Prior to the expiration of the latter five second interval, a branch circuit is energized through the #1 set of normally-closed contacts of relay R-4 which can be traced from these contacts through a line 269 leading to solenoids S-11 and S-12 which are grounded through the common ground line 267. The energization of solenoid S-11 opens a normally-closed valve V-11 which connects air pressure line 268 to the end of the cylinder 244 to extend the ram plate 248 which pushes the bag at the discharge station onto conveyor 26. The energization of the other solenoid S-11 closes a normally open valve V-12 extending to the other end of the latter mentioned cylinder 244 to disconnect the air pressure line 268 therefrom, thereby relieving pressure at the latter end of the cylinder to effect the desired forward movement of the ram plate 248 in conjunction with the application of pressure to the other end of the cylinder.

The energization of the relay R-2 also results in the energization of the red light 193. The energization circuit for the latter light can be traced from ground line 252 through line 271, light 193, line 271', the #3 normally-open but then closed set of contacts of the relay R-2, line 260 and the normally-open but then closed #1 set of contacts of the latter relay which lead to the energized line 258'. When the red light 193 is energized, the green light 195 is de-energized. The circuit for energizing the green light 195 can be traced from the line ground 252 through line 273, the green light 195, line 273', the normally-closed #2 set of contacts of the relay R-1, line 275, normally-closed contacts 277 of the finished bag limit switch 191, line 279 and the #2 set of normally-closed but then open contacts of the relay R-2 leading to line 250 through the normally-closed "off" push button switch 256.

Five seconds after the start of the bag-filling cycle, the above mentioned five-second delay relay R-4 pulls-in to open its #1 set of normally-closed contacts and close its #2 set of normally-open contacts. Closure of the #2 set of normally-open contacts completes an energization circuit extending from the then energized line 258 through the latter #2 set of contacts and line 281 leading to the coil R-5' of a five second time delay relay R-5 which will pull-in ten seconds after the beginning of the bag-filling cycle. The pulling-in of the five second time delay relay R-4 also energizes a relay R-6 through a circuit extending from the energized line 258 and through the then closed #2 set of contacts of time delay relay R-4, line 283, the #1 set of normally-closed contacts of relay R-1, line 283', the #1 set of normally-closed contacts of relay R-5, and line 283" leading to the grounded coil R-6' of relay R-6. The relay R-6 immediately operates to close its #1 set of normally-open contacts and open its #2 set of normally-closed contacts.

The closure of the #1 set of contacts establishes an energization circuit extending from the ungrounded side of relay coil R-6' through the latter #1 set of contacts and line 285 leading to a solenoid S-9 grounded through the common ground line 267. The energization of solenoid S-9 opens the normally-closed valve V-9 to connect air pressure line 268 to the bottom of vertical air cylinder 154 to effect the raising of the jolting and lifting apparatus 16 against the bottom of the bag 14. As above indicated, shaking of the bag 14 is generated by the riding of roller 162 over the bag-vibrating cam ring 161.

The opening of the #2 set of normally-closed contacts of the relay R-6 performs no control function because the line 287 connected to the latter contacts extends to the then open #5 set of normally-open contacts of relay R-1.

Five seconds after the energization of the five second time delay relay R-4, which is ten seconds from the beginning of the bag-filling cycle, relay R-5 pulls-in to open its #1 set of normally-closed contacts. Opening of the #1 contacts opens the energization circuit to the coil R-6' of relay R-6. The consequent immediate opening of the normally-open #1 set of contacts of the latter relay de-energizes solenoid S-9 to close the valve V-9 which shuts off air pressure from the bottom of air cylinder 154 controlling the elevation of the jolting and lifting apparatus 16, which results in the lowering of the latter apparatus to enable the weighing apparatus to accurately measure the weight of the bag contents. Closure of the #2 set of normally-closed contacts of the relay R-6 has no effect on the circuit because the line 287 connected thereto is de-energized through the #5 set of normally-open contacts of the relay R-1. When the latter #5 contacts close, this prepares the pusher apparatus 18 for operation when the jolting and lifting mechanism 16 is again raised to bring the switch-actuating arm 173 thereof against the limit switch 177. The closure of the limit switch 177 during the first raising of the jolting and lifting apparatus had no effect because of the latter #5 set of normally-open contacts.

Closure of the #2 set of contacts of the time delay relay R-5 ten seconds after the beginning of a bag-filling cycle completes an energization circuit for the coil R-3' of relay R-3. This energization circuit can be traced from the latter coil through line 288, the then closed #2 set of contacts of the relay R-5 and a line 288' extending to the energized branch line 258". This opens the #2 set of normally-closed contacts of the relay R-3 to interrupt the line 265 leading to the solenoid S-4 which controls the valve V-4. De-energization of the solenoid S-4 opens the valve V-4 to apply air pressure to the dribble feed air valve 76 which effects the extension of the ramrod 76 to partially collapse the collapsible conduit 44, resulting in a substantial reduction in the feeding rate of material to the filling tube. This enables a more accurate weighing operation to be carried out.

Closure of the #2 set of normally-open contacts of relay R-5 completes a circuit extending from energized branch line 258" and through the latter #2 set of controls, a line 289 and a solenoid S-10 grounded through ground line 267. Solenoid S-10 controls a normally-closed valve which is opened upon energization of solenoid S-10 to apply pressure to the bottom of air cylinder 228, which raises arm 222 (FIG. 7) and lowers the gate 216 to discharge the bag at the checking station to the discharge station.

When the weight of the contents of the bag reaches the desired value, the weight limit switch 101 is tripped which results in the closing of the #1 set of contacts thereof and the opening of the #2 set of contacts thereof. The opening of the #2 set of contacts of the limit switch 101 opens or de-energizes the series connected lines 262 and 260 extending through the #7 set of contacts of the relay R-1 to the #1 holding contacts of the relay R-2. The holding circuit of relay R-2 is thus broken which de-energizes the latter relay. The line 258' associated with the interrupted circuit just described also becomes de-energized which results in the de-energization of solenoids S–1, S–5, and S–6 associated with the line 258'. Line 258 which branches from line 258' also becomes de-energized to thus immediately de-energize and operate relay R–4 connected thereto. De-energization of relay R–4 also immediately de-energizes and operates relay R–5 as the #2 set contacts of R–4 open. De-energization of solenoid S–1 closes the valve V–1 which effects the raising of the clamp disc 134 of the bag-holding means to unclamp the bag from the filling tube. The de-energization of solenoid S–5 closes the valve V–5 to disconnect air pressure from the air pressure chamber 38 at the bottom of the hopper 29. The de-energization of the solenoid S–6 opens the normally-open valve V–6 which applies pressure to one end of the shut-off air cylinder 78 which effects the extension of the ramrod 80 to fully collapse the collapsible conduit 44.

As the relay R–5 becomes de-energized, its #2 set of contacts open as above indicated so as to open the line 289 extending to the solenoid S–10. De-energization of solenoid S–10 closes the normally-closed valve V–10 disconnecting air pressure from the air cylinder 228 controlling the movement of the gate 216. At the instant involved, the piston in the cylinder 228 will drop, thereby raising the gate 216 into its bag-stopping position.

The de-energization of the relay R–2 and the consequent closing of its #4 set of normally-closed contacts establishes an energization circuit for the coil R–1' of relay R–1 extending from the latter coil through a line 292, the #4 set of contacts of relay R–2, a line 294, the then closed #1 set of contacts of the weight limit switch 101 and line 264 extending to the normally-closed stop push button switch 256 connected to the power line 250. With the energization of the relay coil R–1', a holding circuit for relay R–1 is established extending from line 292 and through the #3 set of contacts of relay R–1, line 275, the normally-closed finished bag limit switch contacts 277, line 279, the #2 set of normally-closed contacts of relay R–2, and line 279' leading to the "off" push button switch 256 connected to power line 250. This holding circuit for the relay R–1 is required because, as soon as the bag is discharged from the filling tube, the #1 set of contacts of the weight limit switch 101 will open, thereby breaking the previously mentioned energization circuit for relay R–1.

Energization of the relay R–1 also results in the opening of the #1 set of normally-closed contacts thereof. The opening of these contacts does not form any immediate function because they extend to the coil of the delay relay R–5 which is already de-energized through the open #2 set of contacts of relay R–4.

When the relay R–1 is energized, the #2 set of normally-closed contacts thereof open a circuit in series with the green light 195 to keep this light shut off until the current bag filling and handling cycle is complete, and the #4 set of normally-open contacts close to keep the red light 193 on through the previously traced energization circuit therefor. Also, the #5 set of normally-open contacts of relay R–1 close to energize a solenoid circuit extending from the then energized line 292 and through the last-mentioned contacts, line 287, the #2 set of normally-closed contacts of the de-energized relay R–6, line 285, and the grounded solenoid S–9 controlling the valve V–9. Energization of the solenoid S–9, as previously indicated, effects the opening of the normally-closed valve V–9 which applies air pressure to the bottom of the cylinder 154 which raises the jolting and lifting apparatus 16 to bring the platform 166 thereof against the bottom of the bag 14 which removes the weight of the bag from the filling tube. When the jolting and lifting apparatus is raised to its uppermost position, the switch-actuating arm 173 thereof closes the limit switch 177 to complete a circuit to solenoids S–7 and S–8 controlling air pressure from the end of the cylinder 180 controlling the pusher plate 184. This energization circuit can be traced from the upper ends of the solenoids S–7 and S–8, which respectively control normally-open and normally-closed air valves V–7 and V–8, through a line 302, the limit switch 177 and the then energized line 297. Energization of the solenoids S–7 and S–8 applies air pressure to the left hand side of air cylinder 180 which results in the extension of pusher plate 184 which pushes the bag 14 loosely held on the filling tube off the platform 166 upon the conveyor means.

A blowout solenoid S–2 becomes energized simultaneously with the solenoids S–7 and S–8 since solenoid S–2 is connected to the same line 302 to which the latter solenoids are connected. This closes a normally-open valve V–2 which normally connects air pressure line 268c to the left end of an air valve cylinder 303 having a piston valve 303' spring-urged to the left. When air pressure is applied to the left hand end of the cylinder 303 the piston valve is pushed to the right to uncover a port 304 leading to an air pressure accumulation tank 305. The pressure builds up in the tank to a given air pressure under control of a pressure regulator 306. When solenoid S–2 is energized, the valve V–2 is closed, whereupon the spring-urged piston valve 303' is pushed to the left of the port 304 so that the air pressure in the tank 305 is applied through a port 307 in the right end of the cylinder 304 to the base of the filling tube 12 which blows out any material remaining therein into the mouth of the bag 14 as it is being pushed off the filling tube.

The energization of relay R–1 also opens the normally-closed #7 and #8 sets of contacts thereof which respectively open a circuit in series with the #1 set of holding contacts of the relay R–2 and open the line 256 in series with the start push button switch 254 to prevent the beginning of a new filling cycle until relay R–1 is de-energized upon opening of the finished bag limit switch 191.

The finished bag limit switch is momentarily opened as a bag passes from the conveyor means 20 to the weighing station 6 of the machine. This breaks the holding circuit to the relay coil R–1' which de-energizes the same. This therefore closes the #7 and #8 sets of contacts of the latter relay to prepare the machine for a new operating cycle upon the depression of the start push button 254.

The filling of a bag can be stopped at any time by depression of the stop push button switch 256 which results in the breaking of the holding contacts for the relay R–2.

As previously indicated, instead of having a push button type of start switch for initiating a bag filling operation, such an operation may be automatically effected by means of a photo-cell control circuit. To this end, referring now more particularly to FIG. 11, a light source 310 may be mounted in any suitable manner upon the framework 31 on one side of and below the filling tube 12, so that the light beam thereof will be blocked by a bag 14 suspended from the filling tube. A photo-cell 311 is supported from the framework 31 on the opposite side of and below the filling tube 12 so that the photo-cell will be in the path of the light of light source 310 when the filling tube is without a bag. When a bag is inserted upon the filling tube 12, the light beam from the light source 310 is interrupted by the bag and this effects a sudden change in the output of the photo-cell 311 which change is amplified by an A.C. amplifier 312 to produce a signal which energizes momentarily a start relay 313. The relay 313 has a set of contacts 314 which momentarily close during the momentary energization of relay 313. Contacts 314 take the place of the start push button switch 254 in the circuit diagram of FIGS. 10a and 10b.

In accordance with another aspect of the present invention, a modified form of bag is utilized which omits the sleeve 126 for sealing purposes and provides glue-applying apparatus 315 (see FIG. 12) and sealing apparatus 316 for closing the filling opening of the bag. Preferably, the glue-applying apparatus and the sealing apparatus are positioned at the discharge station 8 of the machine.

The gluing and sealing apparatus may be supported from an arm 318 extending from a support post 320 mounted in any suitable way upon the outside end of the framework 233 at the discharge station of the machine. The arm 318 extends rearwardly therefrom over the discharge station.

The glue-applying apparatus may comprise a rotary type solenoid 322 which is energized when a bag 14' is conveyed to the discharge station. To this end, a limit switch 323 is provided at the discharge station which is operated by the bag. A U-shaped glue-applying tube 324 is mounted on the armature of the solenoid for rotary movement between a position (FIGS. 13–15) where the end of the tube 324 extends into the filling opening 124' of a modified bag 14' during the energized state of the solenoid, and a position (FIG. 12) where the tube is pivoted away from the bag during the de-energized state of the solenoid.

The filling opening 124' of the bag 14' extends horizontally and is formed by a pair of opposed collapsible wall portions 326—328. The end of the tube 324 has a series of nozzle holes 327 through which glue may be forced under pressure generally radially outwardly so that glue is applied to the inner surfaces of the opposed wall portions 326 and 328 of the bag 14'. A conduit 324' in communication with the inner end of the tube 324 extends to a glue control valve 329 controlled by a solenoid 330. The valve and solenoid are mounted upon a bracket 331 secured to the arm 318. A conduit 333 connects the valve 329 to a pressurized elevated glue storage tank 335 supported from a bracket 334 supported upon the arm 318. When the glue-applying tube 324 is inserted into the bag opening 124', an arm 336 carried by the armature of the rotary solenoid contacts a switch 338 mounted on the casing of the solenoid which energizes solenoid 330 to open the valve 329 which applies glue to the nozzle openings 327 at the end of the glue-applying tube 324. The control circuit for the solenoid 322 is such that tube 324 remains in the opening for only a sufficient time to expel the glue.

When the glue-applying tube is retracted from the bag opening 124', sealing means 316 is operated. The sealing means may comprise a pressure plate 340 mounted for vertical movement upon a rod 342 connected to a piston, not shown, within an air cylinder 344. Air lines extend to opposite ends of the cylinder 344 and are controlled by a solenoid-operated valve, not shown. As soon as the glue-applying tube 324 is retracted from the bag 14', air pressure is fed to the cylinder 344 to force the pressure plate 330 downwardly against the top of the bag (FIGS. 16 and 17) so as to bring the upper wall 326 of the bag 14' against the bottom wall 328, so that the glue may secure the two walls together. Pressure plate 340 is lowered for only a moment, and, after it is raised, the previously mentioned bag-pushing apparatus 24 is rendered operative to push the bag 14' off the discharge station upon the conveyor 26.

The control circuit which controls the sequence of operation of the glue-applying and bag closing operations just discussed is shown in FIG. 18. The limit switch 323 whose contacts are normally open are connected between the power line 250 and a small motor 350 connected to the ground line 252. The motor 350 is also connected to power line 250 through an alternate branch including a normally-closed set of contacts 354 which are open momentarily once every revolution of the motor by a cam projection 356' of a cam 356 driven by the motor 350. The motor 350 also drives cams 358, 360 and 362 having respective cam projections 358', 360' and 362'. These cam projections occupy different circumferential positions on these cams so that the cams are sequentially operative to close respective contacts 358", 360" and 362". Cams 358, 360 and 362 make one revolution for each revolution of the cam 356. Contacts 358" are connected between power line 250 and the coil of solenoid 322 connected to the ground line 252. Contacts 360" are connected between power line 250 and a grounded solenoid 364 which controls a valve not shown, which applies air pressure either to the upper or lower line of the air cylinder 334 controlling the raising and lowering of the pusher plate 340. Contacts 362" are connected between power line 250 and a grounded solenoid 366 which controls a valve, not shown, controlling the feeding of air pressure to the air cylinder 244 of bag-discharging means 24.

The control circuit also includes the limit switch 338 operated by the arm 336 carried by the armature of solenoid 322. The contacts of limit switch 338 are connected between power line 250 and the solenoid 330 which is connected to ground line 252. Solenoid 330, as above explained, controls the glue valve 329. Solenoid 322, as above explained, controls the movement of the glue-applying tube 324.

Upon the initiation of the energization of motor 350 by the closure of limit switch 323, cam 358 closes the contacts 358" to energize the solenoid 322 to bring the tube 324 into the bag opening 124'. When the armature of the solenoid 322 reaches the position which closes the above mentioned limit switch 338, solenoid 330 is energized. This opens the glue valve 329 which feeds glue to the glue-applying tube 324. When the contacts 358' leave the cam projection 358', solenoid 322 becomes de-energized which results in the retraction of the tube 324 from the bag opening 124'.

Next, the cam projection 360' of the cam 360 closes contacts 360" to complete a circuit which energizes a solenoid 364 which controls a valve not shown, which applies pressure to the upper air line leading to the air cylinder 344 so as to lower the pusher plate 340 to close the bag opening. When the cam projection 360' leaves the contacts 360", solenoid 364 becomes de-energized which results in the operation of the associated valve which feeds air pressure to the lower line which raises the pusher plate 340.

Next, the cam projection 362' of the cam 362 closes the contacts 362" to complete a circuit to the solenoid 366 which feeds air pressure to the rear air line 245 of the cylinder 244 (FIG. 12) to cause the piston therein to move the pusher plate 248 forwardly and push the bag off the conveyor. When the bag is pushed off the discharge station, the limit switch 323 opens. However, the motor 350 is still energized through contacts 354 which are not open until cam 356 reaches its starting position where its cam projection 356' separates the contacts 354 and terminates an operating cycle for the motor. The motor is then de-energized and remains de-energized until the next bag is delivered to the discharge station, whereupon the limit switch 323 in series with the motor 350 is closed.

It should be understood that numerous modifications may be made of the preferred forms of the invention above described without deviating from the broader aspects of the invention.

I claim as my invention:

1. In an automatic filling and weighing machine for use with pulverulent material, the machine including a collapsible feed conduit, an open-ended filling tube connected at one end to said conduit and adapted to dispense material into a container to be filled with said pulverulent material, and weighing means adapted to receive the weight of said container when being filled through said filling tube, the improvement comprising first feed rate control means located on one side of said collapsible conduit and movable from a first position where the collapsible conduit is in a relatively uncollapsed condition to a second position where it partially collapses the same to provide a dribble feed of said pulverulent material therethrough, second feed control means mounted in confronting relation to said first feed rate control means on the opposite side of said collapsible conduit and movable from a first position to a second shut-off position where it completely collapses said conduit against the portion already collapsed by said first feed rate control means to stop the flow of pulverulent material therethrough, means for operating said first control means from said first to said second position thereof when said bag has received most but not all of the quantity of material which it is to contain, and means controlled by said weighing means for operating said second feed control means from said first to said second shut-off position when the bag has reached full weight.

2. In an automatic filling and weighing machine for use with pulverulent material, the machine including a feed conduit, an open-ended, horizontally extending filling tube connected at one end to said conduit and adapted to extend into a horizontally disposed opening in the top of a container to be filled with said pulverulent material, and weighing means adapted to receive the weight of said container when being filled through said filling tube, the improvement comprising means for closing said conduit ahead of said filling tube when said bag has been substantially filled, a source of air under pressure, an air line extending from said source of air pressure and communicating with said filling tube downstream from and adjacent to the point of closure of said conduit, normally-closed valve means for opening and closing said air line, and means responsive to said weighing means for opening said valve means immediately following the closure of said conduit and prior to removal of the container from the filling tube to connect said source of air pressure to said filling tube which forces pulverulent material remaining in said filling tube into said container.

3. In an automatic filling and weighing machine for use with pulverulent material, the machine including a feed conduit, an open-ended, horizontally extending filling tube connected at one end to said conduit and adapted to extend into a horizontally disposed opening in the top of a container to be filled with said pulverulent material, and weighing means adapted to receive the weight of said container when being filled through said filling tube, the improvement comprising means for closing said conduit ahead of said filling tube when said bag has been substantially filled, means for automatically removing said container from the filling tube when it has been filled, a source of air under pressure, an air line extending from said source of air pressure and communicating with said filling tube downstream from the point of closure of said conduit, normally-closed valve means for opening and closing said air line, and means responsive to said weighing means for opening said valve means following the closure of said conduit and prior to the removal of said bag from the filling tube, to connect said source of air pressure to said filling tube which forces pulverulent material remaining in said filling tube into said container.

4. In an automatic filling and weighing machine for use with pulverulent material, the machine including a feed conduit, and an open-ended, horizontally extending filling tube connected at one end of said conduit and adapted to extend into a horizontally disposed opening in the top of a container to be filled with said pulverulent material, and weighing means adapted to receive the weight of said container when being filled through said filling tube, the improvement comprising means for closing said conduit ahead of said filling tube when said bag has been substantially filled, means controlled by said weighing means for automatically removing said container from the filling tube when it has been filled, a source of air under pressure, an air line extending from said source of air pressure and communicating with said filling tube downstream from the point of closure of said conduit, normally-closed valve means for opening and closing said air line, and means controlled by said weighing means for opening said valve means following the closure of said conduit and prior to the removal of said bag from the filling tube to connect said source of air pressure to said filling tube which forces pulverulent material remaining in said filling tube into said container.

5. In an automatic bag-filling and weighing machine for use with pulverulent material, the machine including a hopper for holding a supply of said pulverulent material, a collapsible conduit connected at one end to the bottom of said hopper, an open-ended, horizontally extending filling tube connected to the other end of said conduit and adapted to extend into a horizontally disposed opening in the top of a bag to be filled with said pulverulent material, weighing means carrying the weight of said filling tube and clamping means for holding said bag upon said filling tube while the tube is extending into said bag opening so that the bag is suspended from the filling tube, the improvement comprising first feed rate control means located on one side of said collapsible conduit and movable from a first position where the collapsible conduit is in a relatively uncollapsed condition to a second position where it has moved well past the initial center point of the conduit almost to fully collapse the conduit to provide a dribble feed of said pulverulent material therethrough, second feed control means mounted in confronting relation to said first feed rate control means on the opposite side of said collapsible conduit and movable from a first position to a second position where it completely collapses said conduit against the portion already collapsed by said first feed rate control means to stop the flow of pulverulent material therethrough, means for forcing pulverulent material in said hopper under force of air pressure through said collapsible conduit and into said filling tube, means for operating said first control means from said first to said second position thereof when said bag has received most but not all of the quantity of material which it is to contain, means controlled by said weighing means for operating said second feed control means from said first to said second shut-off position when the bag has reached full weight, and means controlled by the weighing means for automatically releasing said bag clamping means subsequent to the filling of said bag to release the bag from said filling tube.

6. An automatic bag-filling and weighing machine for use with pulverulent material, the machine including an open-ended, horizontally extending filling tube adapted to extend into a horizontally disposed opening formed in the top of a bag to be filled and to dispense pulverulent material therein, weighing means carrying the weight of said filling tube, holding means for holding said bag upon said filling tube while the tube is extending into said bag opening so that the bag is suspended from the filling tube, jolting means for shaking said bag while suspended from said filling tube during the filling thereof to compact the pulverulent material therein, means for raising said jolting means against the bottom of the bag suspended from said filling tube as the bag is being filled to shake the same, lowering the same to remove the jolting means therefrom before the bag reaches full weight to enable the weighing means accurately to weigh the same, and subsequently raising said jolting means a second time against the bottom of the bag to lift it from the filling tube after the bag has been filled, bag-release means for effecting the release of the bag from said filling tube after the bag has been filled, and bag-removing means for discharging the bag from the filling tube after the jolting means is raised said second time.

7. In an automatic bag-filling and weighing machine for use with pulverulent material, the machine including an open-ended, horizontally extending filling tube adapted to extend into a horizontally disposed opening formed in the top of a bag to be filled and to dispense pulverulent material therein, weighing means carrying the weight of said filling tube, holding means for holding said bag upon said filling tube while the tube is extending into said bag opening so that the bag is suspended from the filling tube, jolting means for shaking said bag during the initial filling thereof while the bag is suspended from said filling tube to compact the pulverulent material therein, a frame carrying said jolting means, said frame being mounted for movement between a lowered position, where said jolting means is out of contact with the bag supported from said filling tube, thereby permitting said weighing means accurately to weigh the bag, and a raised position where the jolting means engages and supports the bottom of the bag to shake it and to remove the weight of the bag from the filling tube for enabling the bag to be removed from the filling tube upon release of said holding means, means for effecting the movement of said frame to said raised position as the bag is being filled to render said jolting means operative to shake the bag, means for effecting the movement of said frame to said lowered position before the bag is filled, means for effecting the movement of said frame again to said raised position to lift the bag from the filling tube when said bag has been filled to the desired weight, bag-release means for effecting the disengagement of said holding means from said bag to release the bag from said filling tube when the bag has been filled, bag-removing means for removing the bag from said filling tube, a control circuit for operating said bag-removing means, and electrical limit switch means operated by said frame in its raised position for operating said control circuit to effect the operation of said bag-removing means, said control circuit including preparing switch means for preparing the control circuit for operation by said limit switch means only when the bag has been filled to the desired weight.

8. In an automatic bag-filling and weighing machine for use with pulverulent material, the machine including an open-ended, horizontally extending filling tube adapted to extend into a horizontally disposed opening formed in the top of a bag to be filled and to dispense pulverulent material therein, weighing means carrying the weight of said filling tube, holding means for holding said bag upon said filling tube while the tube is extending into said bag opening so that the bag is suspended from the filling tube, jolting means for shaking said bag during the initial filling thereof while the bag is suspended from said filling tube to compact the pulverulent material therein, a frame carrying said jolting means, said frame being mounted for movement between a lowered position, where said jolting means is out of contact with the bag supported from said filling tube, thereby permitting said weighing means accurately to weigh the bag, and a raised position where the jolting means engages and supports the bottom of the bag to shake it and to remove the weight of the bag from the filling tube for enabling the bag to be removed from the filling tube upon release of said holding means, means for effecting the movement of said frame to said raised position as the bag is being filled to render said jolting means operative to shake the bag, means for effecting the movement of said frame to said lowered position a given time interval after a filling operation begins and before the bag is filled, means responsive to said weighing means for effecting the movement of said frame again to said raised position to lift the bag from the filling tube when said bag has been filled to the desired weight, bag-release means controlled by said weighing means for effecting the disengagement of said holding means from said bag to release the bag from said filling tube when the bag has been filled, bag-removing means for pushing the bag from said filling tube, a control circuit for operating said bag-removing means, and electrical limit switch means operated by said frame in its raised position for operating said control circuit to effect the operation of said bag-removing means, said control circuit including preparing switch means responsive to said weighing means for preparing the control circuit for operation by said limit switch means only when the bag has been filled to the desired weight.

9. In an automatic bag-filling and weighing machine for use with pulverulent material, the machine including an open-ended, horizontally extending filling tube adapted to extend into a horizontally disposed opening formed in the top of a bag to be filled and to dispense pulverulent material therein, weighing means carrying the weight of said filling tube, holding means for holding said bag upon said filling tube while the tube is extending into said bag opening so that the bag is suspended from the filling tube, jolting means for shaking said bag during the initial filling thereof while suspended from said filling tube to compact the pulverulent material therein, time-responsive control means, means responsive to said time-responsive means and said weighing means for raising said jolting means against the bottom of the bag suspended from said filling tube as the bag is being filled to shake the same, for lowering the same to remove the jolting means therefrom before the bag reaches full weight to enable the weighing means accurately to weigh the same a given time interval after a filling operation begins, and for subsequently raising said jolting means a second time against the bottom of the bag to lift it from the filling tube after the bag has been filled, bag-release means responsive to said weighing means for effecting the disengagement of said holding means from said bag to release the bag from said filling tube after the bag has been filled, bag-removing means for pushing the bag from said filling tube, and control means responsive to the raising of said jolting means against the bottom of the bag and to said weighing means for operating said bag-removing means to effect the discharging of the bag from the filling tube after the jolting means is raised said second time.

10. An automatic bag-filling and conveying machine having a bag-filling station and a checking station, a filling tube at said filling station adapted to extend into a bag to be filled, bag-holding means for holding said bag at said filling station, valve means for controlling the flow of material to be packaged to said filling tube, first control means adapted when operated from a first condition to a second bag-filling cycle initiating condition to operate said bag-holding means to its bag-holding position and to open said valve means to start the flow of said material to said filling tube, start means for initiating the operation of said first control means to said second condition, second control means operated from a first non-disabling to a second disabling condition when the bag is filled for returning said first control means to said first condition and disabling it from operation to its second condition, to effect the closing of said valve means and the release of said bag from said bag-holding means, means for depositing said bag at said checking station upon release of same from said bag-holding means, bag position-responsive means which indicates the passage of a bag to said checking station, and means connecting said bag position-responsive means to said second control means for returning the same to its first non-disabling condition to free the first control means for operation to its second bag-filling cycle initiating condition when a bag is conveyed from said bag-filling station to said checking station.

11. An automatic bag-filling and conveying machine having a bag-filling station and a checking station, a filling tube at said filling station adapted to extend into a bag to be filled, bag-holding means for holding said bag at said filling station, valve means for controlling the flow of material to be packaged to said filling tube, an inclined platform at said checking station, normally-closed gate means at the lower end of said platform for holding a bag upon said inclined platform, conveyor means extending from a point adjacent said bag-filling station to said checking station for conveying bags by force of gravity to said platform, first control means adapted when operated from a first condition to a second bag-filling cycle initiating condition to operate said bag-holding means to its bag-holding position and to open said valve means to start the flow of said material to said filling tube, start means for initiating the operation of said first control means from said first to said second condition, second control means operable a given time interval after the initiation of said operation of said first control means for opening said normally-closed gate means to allow the movement of a previously filled bag from said checking station, said time interval being at least sufficient to enable an operator to check the bag at said checking station and being less than the time required to fill the bag then at said filling station and convey it to said checking station, third control means operated from a first non-disabling to a second disabling condition when the bag is filled for returning said first control means to said first condition and disabling it from operation to its second condition, to effect the closing of said valve means and the release of said bag from said bag-holding means, means at said filling station for discharging the bag thereat to said conveyor means when the bag has been released from said bag-holding means, means for depositing said bag at said checking station upon release of same from said bag-filling station, bag position-responsive means which indicates the passage of a bag to said checking station, and means connecting said bag position-responsive means to said third control means for returning the same to its first non-disabling condition to free the first control means for operation to its second bag-filling cycle initiating condition when a bag is conveyed from said bag-filling station to said checking station.

12. An automatic bag-filling and conveying machine having a bag-filling station and a weight-checking station, a filling tube at said filling station adapted to extend into a bag to be filled, bag-holding means for holding said bag at said filling station, valve means for controlling the flow of material to be packaged to said filling tube, a weighing scale having a weighing platform at said weight-checking station for enabling an operator to visually check the weight of the filled bags fed to said platform, an inclined conveyor means extending from a point adjacent said bag-filling station to said weight-checking station for conveying bags to said platform of said weighing scale, first control means adapted when operated from a first condition to a second bag-filling cycle initiating condition to operate said bag-holding means to its bag-holding position and to open said valve means to start the flow of said material to said filling tube, start means for initiating the operation of said first control means from said first to said second condition, second control means operated from a first non-disabling to a second disabling condition when the bag is filled for returning said first control means to said first condition and disabling it from operation to its second condition, to effect the closing of said valve means and the release of said bag from said bag-holding means, means for depositing said bag at said weight-checking station upon release of same from said bag-filling station, bag position-responsive means which indicates the passage of a bag to said checking station, and means connecting said bag position-responsive means to said third control means for returning the same to its first non-disabling condition to free the first control means for operation to its second bag-filling cycle initiating condition when a bag is conveyed from said bag-filling station to said checking station.

13. An automatic bag-filling and conveying machine having a bag-filling station and a checking station, a filling tube at said filling station adapted to extend into a bag to be filled, bag-holding means for holding said bag at said filling station, valve means for controlling the flow of material to be packaged to said filling tube, conveying means for delivering bags from said bag-filling station to said checking station when the bag is released from said filling station, first control means adapted when operated from a first condition to a second bag-filling-cycle-initiating condition to operate said bag-holding means to its bag-holding position and to open said valve means to start the flow of said material to said filling tube, second control means for returning said first control means to its first condition to effect the closing of said valve means and the release of the bag from said bag-holding means when the bag at the bag-filling station is filled, means at said filling station for discharging the bag thereat to said conveying means when the bag has been released from said bag-holding means, bag position-responsive means which indicates the passage of a bag to said checking station, and interlock means responsive to said bag position-responsive means for normally preventing the return of said first control means to its second filling-cycle-initiating condition until a bag is conveyed to said checking station.

14. An automatic bag-filling and conveying machine having a bag-filling station, a weight-checking station and a discharge station, a filling tube at said filling station adapted to extend into a bag to be filled, valve means for controlling the flow of material to be packaged to said filling tube, a weighing scale with a platform at said weight-checking station for enabling an operator to visually check the weight of the filled bags fed to said platform, conveying means for delivering said bag from said bag-filling station to said platform of said weighing scale when the bag has been filled, delivering means for delivering said bag from said weight-checking station to said discharge station after the bag has been checked, first control means adapted when operated from a first to a second bag-filling-cycle-initiating condition to open said valve means to start the flow of said material to said filling tube, second control means for returning said first control means to its first condition to effect the closing of said valve means when the bag at the bag-filling station is filled, and third control means operable a given time interval after the initiation of operation of said first control means for effecting the delivery of a checked bag at said checking station to said discharge station by said delivering means to allow the passage of a newly filled bag to said checking station, said time interval being at least sufficient to enable an operator to check the weight of the bag on said weighing scale platform.

15. An automatic bag-filling and conveying machine having a bag-filling station, a weight-checking station and a discharge station, a horizontally-extending filling tube at said filling station adapted to extend into a horizontally disposed opening in the top of the bag to be filled, bag-holding means for holding said bag against said filling tube so that the bag is suspended therefrom at said filling station, valve means for controlling the flow of material to be packaged to said filling tube, a weighing scale with a platform at said weight-checking station for enabling an operator to visually check the weight of the filled bags fed to said platform, conveying means extending from a point adjacent said bag-filling station to said weight-checking station for conveying bags one at a time from said bag-filling station to said platform of said weighing scale when the bag is released from said filling station, delivering means for delivering bags one at a time from said weight-checking station to said discharge station, bag-discharging means at the discharge station adapted when operated to remove the bags one at a time from said discharge station, first control means adapted when operated from a first to a second bag-filling-cycle-initiating condition to operate said bag-holding means to its bag-holding position and to open said valve means to start the flow of said material to said filling tube, second control means for returning said first control means to its first condition to effect the closing of said valve means and the release of the bag from said bag-holding means when the bag at the bag-filling station is filled, means at said filling station for discharging the bag thereat to said conveying means when the bag has been released from said bag-holding means, third control means operable a given time interval after the initiation of operation of said first control means for effecting the delivery of a checked bag at said checking station to said discharge station by said delivering means to allow the passage of a newly filled bag to said checking station, said time interval being at least sufficient to enable an operator to check the weight of the bag on said weighing scale platform and being less than the time required to fill the bag then at said filling station and deliver the same to said checking station, fourth control means for operating said bag-discharging means before the bag at said checking station is conveyed to said discharge station, bag position-responsive means at the end of said conveying means which indicates the passage of a bag onto said weighing scale platform at said checking station, and interlock means responsive to said bag position-responsive means for normally preventing the return of said first control means to its second filling-cycle-initiating condition until a filled bag is conveyed to said checking station.

16. An automatic bag-filling and conveying machine having a bag-filling station, a weight-checking station and a discharge station, a horizontally-extending filling tube at said filling station adapted to extend into a horizontally disposed opening in the top of the bag to be filled, bag-holding means adapted to clamp said bag against said filling tube so that the bag is suspended therefrom, weighing means carrying the weight of said filling tube, valve means for controlling the flow of material to be packaged to said filling tube, a weighing scale having an inclined weighing platform at said weight-checking station for enabling an operator to visually check the weight of the filled bags fed to said platform, conveyor means comprising an inclined conveyor extending from a point adjacent said bag-filling station to said weight-checking station for conveying bags by force of gravity to said platform of said weighing scale, normally-closed gate means at the lower end of said platform for holding a bag upon said inclined platform, the opening of said gate means discharging the bag thereat to said discharge station, first control means adapted when operated from a first condition to a second filling cycle-initiating condition to move said bag-holding means to its bag-clamping position and to open said valve means to start the flow of said material to said filling tube, start means for initiating the operation of said first control means to said first condition, second time delay control means operable a given time interval after the initiation of said operation of said first control means for opening said normally-closed gate means to allow the passage of a previously filled bag to said discharge station, said time interval being at least sufficient to enable an operator to check the weight of the bag on said weighing scale platform and being less than the time required to fill the bag then at said filling station and deliver the same to said checking station, third control means operable in response to the operation of said first control means to said condition for operating said bag-discharging means before the bag on said weighing scale platform is conveyed to said discharge station, fourth control means operated from a first non-disabling to a second disabling operating condition by said weighing means when the bag is filled for returning said first control means to said first condition and disabling it from operation to its filling initiating-cycle condition, to effect the closing of said valve means and the release of the bag from said bag-holding means, means at said bag-filling station for discharging the bag thereat to said conveyor means when the bag has been released from said bag-holding means, bag position-responsive means at the end of said conveyor means which indicates the passage of a bag onto said weighing scale platform, and means connecting said bag position-responsive means to said fourth control means for returning the fourth control means to its first non-disabling operating condition to free the first control means for operation to its second cycle-initiating condition when a bag is conveyed from said bag-filling station to said weight-checking station.

References Cited in the file of this patent

UNITED STATES PATENTS

| | | |
|---|---|---|
| 615,493 | Richards | Dec. 6, 1898 |
| 618,384 | Richards | Jan. 24, 1899 |
| 698,520 | Knapp et al. | Apr. 29, 1902 |
| 766,004 | Thomas | July 26, 1904 |
| 1,425,481 | Howard | Aug. 8, 1922 |
| 1,696,952 | Hartman | Jan. 1, 1929 |
| 1,989,471 | Belcher | Jan. 29, 1935 |
| 2,049,757 | Baker et al. | Aug. 4, 1936 |
| 2,052,996 | Witte | Sept. 1, 1936 |
| 2,181,756 | Cook | Nov. 28, 1939 |
| 2,350,529 | Peterson | June 6, 1944 |
| 2,351,606 | Gold et al. | June 20, 1944 |
| 2,546,193 | Lindstaedt et al. | Mar. 27, 1951 |
| 2,688,740 | Merrill et al. | Sept. 27, 1954 |
| 2,765,601 | Anderson | Oct. 9, 1956 |
| 2,866,484 | Rose | Dec. 30, 1958 |
| 2,936,994 | Lau | May 17, 1960 |

FOREIGN PATENTS

| | | |
|---|---|---|
| 11,266 | Australia | Jan. 14, 1929 |
| 609,459 | Germany | Feb. 15, 1935 |
| 665,572 | Germany | Sept. 28, 1938 |
| 315,358 | Switzerland | Sept. 29, 1956 |